(12) United States Patent
Lindell

(10) Patent No.: US 10,447,475 B1
(45) Date of Patent: Oct. 15, 2019

(54) SYSTEM AND METHOD FOR MANAGING BACKUP OF CRYPTOGRAPHIC KEYS

(71) Applicant: Bar Ilan University, Ramat Gan (IL)

(72) Inventor: Yehuda Lindell, Givat Shmuel (IL)

(73) Assignee: BAR ILAN UNIVERSITY, Ramat Gan (IL)

( * ) Notice: Subject to any disclaimer, the term of this patent is extended or adjusted under 35 U.S.C. 154(b) by 0 days.

(21) Appl. No.: 16/183,792

(22) Filed: Nov. 8, 2018

(51) Int. Cl.
| | |
|---|---|
| *H04L 9/08* | (2006.01) |
| *H04L 9/30* | (2006.01) |
| *H04L 9/06* | (2006.01) |
| *H04L 9/32* | (2006.01) |
| *H04L 29/08* | (2006.01) |

(52) U.S. Cl.
CPC .......... *H04L 9/0894* (2013.01); *H04L 9/0643* (2013.01); *H04L 9/085* (2013.01); *H04L 9/0822* (2013.01); *H04L 9/3066* (2013.01); *H04L 9/3218* (2013.01); *H04L 67/1097* (2013.01)

(58) Field of Classification Search
CPC ... H04L 9/0894; H04L 9/0822; H04L 9/3066; H04L 9/0643; H04L 9/3218; H04L 9/085; H04L 67/1097
See application file for complete search history.

(56) References Cited

U.S. PATENT DOCUMENTS

| | | | | |
|---|---|---|---|---|
| 5,825,880 A | * | 10/1998 | Sudia | G06F 21/40 713/180 |
| 8,762,736 B1 | * | 6/2014 | Goldwasser | H04L 9/003 235/375 |
| 9,614,676 B1 | * | 4/2017 | El Defrawy | H04L 9/3218 |
| 9,634,836 B1 | * | 4/2017 | Butzer | H04L 9/0861 |
| 2001/0044895 A1 | * | 11/2001 | Hada | H04L 9/3218 713/168 |
| 2002/0013898 A1 | * | 1/2002 | Sudia | G06Q 20/02 713/155 |
| 2004/0030932 A1 | * | 2/2004 | Juels | H04L 63/083 713/151 |
| 2004/0254967 A1 | * | 12/2004 | Cachin | H04L 9/085 708/250 |
| 2009/0287926 A1 | * | 11/2009 | Furukawa | H04L 9/3221 713/168 |

(Continued)

*Primary Examiner* — Darren B Schwartz
(74) *Attorney, Agent, or Firm* — Gearhart Law, LLC.

(57) ABSTRACT

The claimed invention discloses a system for securing a cryptographic key, comprising multiple computerized nodes, each of them is configured to store a public key and a share of the cryptographic key and configured to encrypt the share of the cryptographic key stored in the computerized node and to generate a zero-knowledge proof using a set of predefined instructions. The system also comprises a processing module electrically coupled to the multiple computerized nodes, configured to transmit a request to each of the nodes for encrypted backup of each share and a zero-knowledge proof, said zero-knowledge proof enables the processing module to verify that the encrypted backup share is valid without revealing the encrypted backup. The processing module then receives the encrypted backup of each share of the cryptographic key from the multiple computerized nodes and computes a predefined equation to validate correctness of each of the encrypted backup of each share of the cryptographic key.

14 Claims, 6 Drawing Sheets

(56) References Cited

U.S. PATENT DOCUMENTS

| | | | |
|---|---|---|---|
| 2010/0037055 A1* | 2/2010 | Fazio | H04L 9/3255 713/171 |
| 2010/0037056 A1* | 2/2010 | Follis | G06F 11/1464 713/171 |
| 2010/0180116 A1* | 7/2010 | Coan | H04L 9/0891 713/168 |
| 2010/0235588 A1* | 9/2010 | Maeda | H04L 9/085 711/147 |
| 2011/0202764 A1* | 8/2011 | Furukawa | G06F 21/6254 713/167 |
| 2011/0239297 A1* | 9/2011 | Unagami | G06F 21/55 726/22 |
| 2012/0063593 A1* | 3/2012 | Camenisch | H04L 9/3073 380/44 |
| 2012/0243687 A1* | 9/2012 | Li | H04L 9/085 380/277 |
| 2013/0042116 A1* | 2/2013 | Sakumoto | H04L 9/3221 713/176 |
| 2013/0089201 A1* | 4/2013 | Sakumoto | H04L 9/3221 380/44 |
| 2014/0122899 A1* | 5/2014 | Hiwatari | H04L 9/3218 713/189 |
| 2015/0381350 A1* | 12/2015 | Joye | H04L 9/06 380/30 |
| 2017/0019385 A1* | 1/2017 | Yoo | H04L 63/061 |
| 2018/0270065 A1* | 9/2018 | Brown | H04L 9/3218 |
| 2018/0337775 A1* | 11/2018 | Camenisch | H04L 9/008 |
| 2018/0375653 A1* | 12/2018 | Setty | H04L 63/062 |

* cited by examiner

SYSTEM AND METHOD FOR MANAGING BACKUP OF CRYPTOGRAPHIC KEYS

FIELD OF THE INVENTION

The present disclosure generally relates to backup of cryptographic keys, and more particularly relates to backup of cryptographic keys when protecting cryptocurrencies.

BACKGROUND OF THE INVENTION

In order to provide a strong custody solution that will be used to store very large amounts of currency, the key used to transfer money is regularly backed up to ensure that money is not irretrievably lost. In more detail, in cryptocurrencies a digital signing key is used to transfer funds, and if this key is lost, the money is all lost. In order to prevent the loss of funds, the signing key needs to be backed up in a secure fashion, as theft of the key would enable the thieves to transfer all of the funds to their own account, in an irreversible fashion. This backup can be achieved by generating a cold-backup public/private key-pair and then encrypting the digital signing private key using the cold-backup public key. The cold-backup private key can be stored in disconnected Hardware Security Modules (HSMs) stored at different locations around the world or in some other very secure way.

In the simple case that a party generates a digital signing key in the standard way, cold backup poses no challenge. However, more advanced solutions use Secure Multiparty Computation (MPC) and threshold cryptography to split the digital signing key into multiple shares and never bring the multiple shares together. Such methods provide strong protection against key theft, and are especially suitable for cryptocurrency custody solutions. In order to understand the challenge in this case, denote by $x\_1, \ldots, x\_n$ the shares of the digital signing private key (where n denotes the number of parties holding shares and $x\_i$ denotes the share of the private key held by the $i^{th}$ party). A simple solution is for each party to separately encrypt its share using the cold-backup public key. Then, if the cold-backup public key is somehow lost, the key can be retrieved by decrypting all of the shares (using the cold-backup private key) and running a standard secret sharing reconstruction mechanism. The problem that arises with this solution is that some of these parties may be adversarial and may intentionally encrypt garbage instead of the correct share. If they did this, then it would be impossible to reconstruct the actual private key, resulting in a loss of all funds. As such, this malicious behavior can result in huge financial losses and thus must be protected against.

SUMMARY OF THE INVENTION

The subject matter discloses a system for securing a cryptographic key, comprising multiple computerized nodes, each of the multiple computerized nodes is configured to store a public key and a share of the cryptographic key, none of the multiple computerized nodes has access to a share of the cryptographic key stored in another computerized node, each of the multiple computerized nodes is configured to encrypt the share of the cryptographic key stored in the computerized node and to generate a zero-knowledge proof using a set of predefined instructions, and a processing module electrically coupled to the multiple computerized nodes, configured to execute the following instructions—transmitting a request to each node of the multiple computerized nodes for encrypted backup of each share of the cryptographic key and a zero-knowledge proof, said zero-knowledge proof enables the processing module to verify that the encrypted backup share is valid without revealing the encrypted backup, receiving the encrypted backup of each share of the cryptographic key from the multiple computerized nodes and computing a predefined equation to validate correctness of each of the encrypted backup of each share of the cryptographic key.

In some cases, the zero-knowledge proof is interactive and the instructions are carried out by at least one node of the multiple computerized nodes. In some cases, the processing module comprises a storage module configured to store multiple equations, and wherein the processing module selects the equation according to the value representing the zero-knowledge proof as received from each node of the multiple computerized nodes. In some cases, the zero-knowledge proof value is selected using a cryptographic function. In some cases, the cryptographic function is a hash function.

In some cases, the processing module obtains a result of a computation of an irreversible function receiving the key share as input. In some cases, the irreversible function is multiplication by the input of the generator of an elliptic curve group having an order known to the processing module. In some cases, the processing module is further configured to store the encrypted cryptographic key shares if all the multiple computerized nodes sent correct values. In some cases, the processing module further comprises a communication module configured to reconstruct the cryptographic key given the cold backup private key and transmit it to a party that requested the cryptographic key.

In some cases, the processing module transmits multiple requests to each node of the multiple computerized nodes, until the number of requests meet a predefined criteria. In some cases, at least one node of the multiple computerized nodes receives a single request from the processing module and generates a zero-knowledge proof comprising multiple values to be computed by the processing module.

The subject matter also discloses a method, comprising receiving a request to use a cryptographic key, said cryptographic key is divided to shares stored in multiple computerized nodes communicating with a processing module, the processing module transmitting a request to each node of the multiple computerized nodes for encrypted backup of each share of the cryptographic key and a zero-knowledge proof, said zero-knowledge proof enables the processing module to verify that the encrypted backup share is valid without revealing the encrypted backup, the processing module receiving the encrypted backup of each share of the cryptographic key from one of the multiple computerized nodes, the processing module computing a predefined equation to validate correctness of each of the encrypted backup of each share of the cryptographic key.

In some cases, the method further comprises storing the encrypted cryptographic key shares received from the multiple computerized nodes upon validating correctness of each of the encrypted backup of each share of the cryptographic key received from the multiple computerized nodes.

In some cases, the method further comprises reconstructing the encrypted cryptographic key using the encrypted key shares received from the multiple computerized nodes and the cold backup private key, after validating correctness of each of the encrypted backup of each share of the cryptographic key received from the multiple computerized nodes.

BRIEF DESCRIPTION OF THE DRAWINGS

The invention may be more clearly understood upon reading of the following detailed description of non-limiting exemplary embodiments thereof, with reference to the following drawings, in which.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION OF THE INVENTION

Illustrative embodiments of the invention are described below. In the interest of clarity, not all features/components of an actual implementation are necessarily described.

The present invention discloses a system and method for managing backup of a cryptographic key, also referred herein as key. The method may be managed by one of multiple computerized nodes used to store shares of the key. In other cases, the method is managed by another entity, also referred to as a processing module, communicating with the multiple computerized nodes. Communication between the processing module and a node of the multiple computerized nodes may be direct or indirect, via an intermedia entity, such as another node. The key may be used in the context of money transfer, for example a Blockchain-related transfer, when a cryptographic key is required to transfer the funds. The key may be used for any other purpose selected by a person skilled in the art.

Each of the multiple computerized nodes stores a share of the key. The shares may be generated using a multi-party computation (MPC) process. The nodes also store a public key and a set of instructions to be executed in response to a request for a backup of the key share from the processing module which manages the backup of the key. The instructions performed by the nodes are detailed below. The processing module comprises a communication module configured to exchange messages with the multiple computerized nodes. The communication module may exchange signals via wireless or wired channels, for example via the internet, on cables, via a cellular network or any communication technique desired by a person skilled in the art. The processing module also comprises a memory unit configured to store a set of instructions to be executed by the processing module and the messages received from the multiple computerized nodes. The messages received from the multiple computerized nodes may be associated with an identifier of the specific node of the multiple computerized nodes that sent the message.

Figure 1:
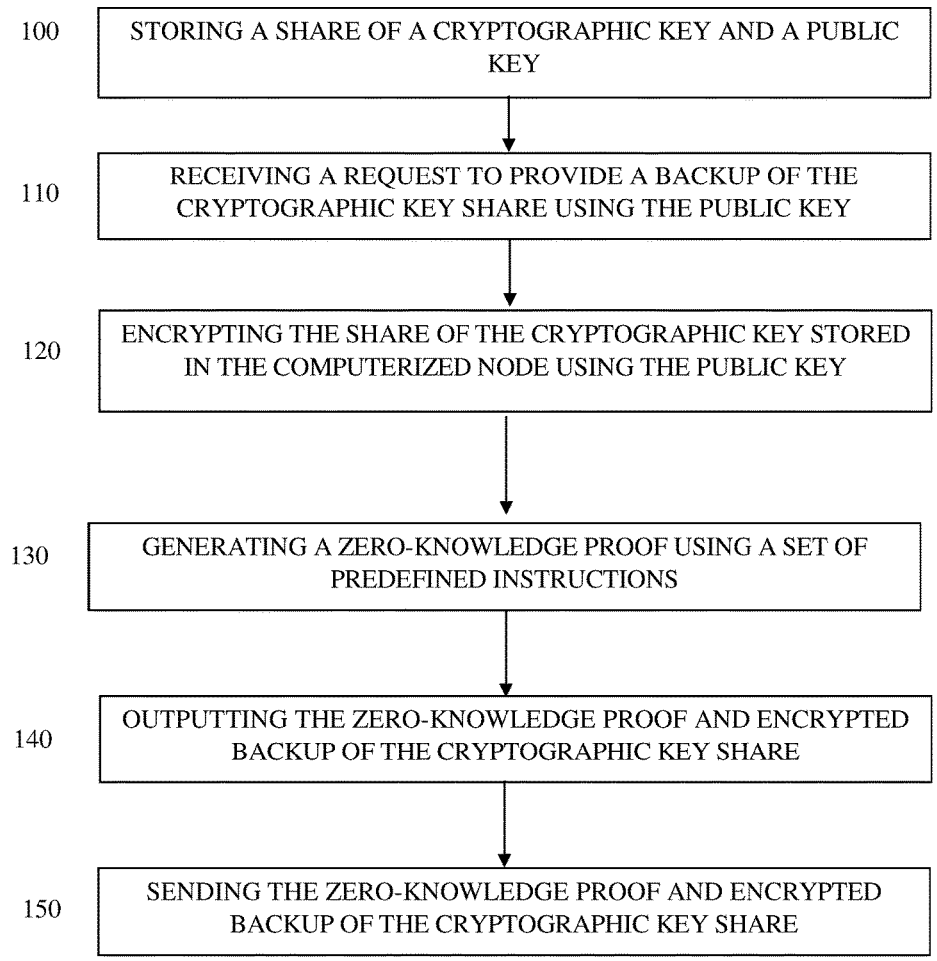
FIG. 1 discloses a method of backing up a key share in a way that correctness of the backup can be verified, according to exemplary embodiments of the subject matter.

FIG. 1 discloses a method of backing up a key share in a way that correctness of the backup can be verified, according to exemplary embodiments of the subject matter. Step 100 discloses storing a share of a cryptographic key and a public key. Thus, each of the nodes stores the key share and the public key, as the key share represents a share of the private key desired to be backed up.

Step 110 discloses the multiple computerized nodes receiving a request to the computerized node to provide a backup of its value of the multiple values. The request may be sent before transferring funds to the address associated with the key, for example in order to ensure that there exists a valid backup before carrying out the transaction. The multiple computerized nodes store shares of the key. For simplicity, the method elaborated below is described referring to one node of the multiple computerized nodes, assuming the same method, mutatis mutandis, is performed in all the multiple computerized nodes holding shares of the key. The request may be received via a communication module installed in the nodes. The nodes may be computers, servers, mobile electronic devices, cellular phones, and any electronic devices having a memory, communication module and memory for storing the key share and performing the instructions disclosed herein.

Step 120 discloses encrypting the share of the cryptographic key stored in the computerized node. Encryption of the key share may be performed using the public key stored in the computerized node.

In step 130, the computerized node generating a zero-knowledge proof using a set of predefined instructions as described in greater detail below. The zero-knowledge proof is defined as an output from which the processing module can verify correctness of the key share without obtaining the key share.

In step 140, the computerized node outputting the zero-knowledge proof and encrypted backup of the cryptographic key share. Step 150 discloses sending the zero-knowledge proof and encrypted backup of the cryptographic key share to the processing module.

Figure 2:
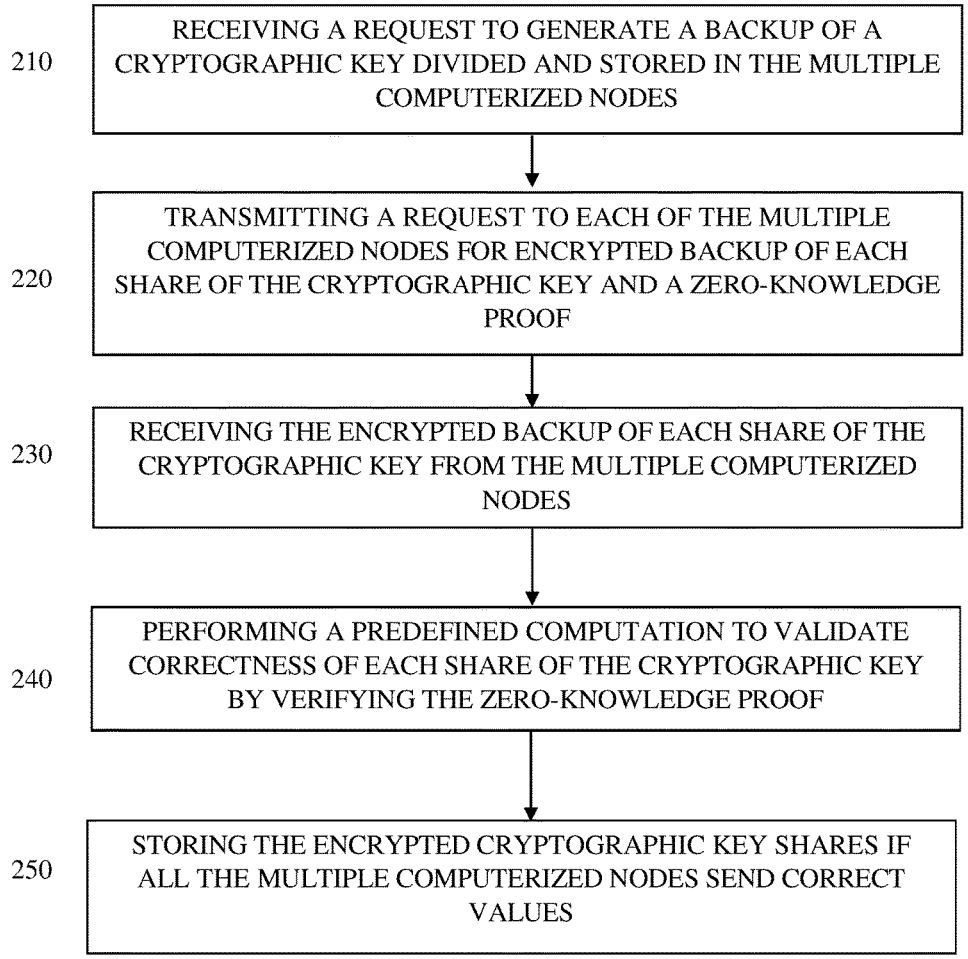
FIG. 2 discloses a method of validating the correctness of encrypted key shares stored in multiple computerized nodes using zero-knowledge, according to exemplary embodiments of the subject matter.

FIG. 2 discloses a method of validating correctness of encrypted key shares stored in multiple computerized nodes using zero-knowledge, according to exemplary embodiments of the subject matter.

Step 210 discloses receiving a request to generate a backup of the cryptographic key divided and stored in the multiple computerized nodes. The request may be received from a third party server or a remote computer that need to perform a task that requires the key. Such task may be authentication, signing and any other task that requires a security key to be completed.

Step 220 discloses transmitting a request to each of the multiple computerized nodes encrypted backup of each share of the cryptographic key and a zero-knowledge proof. In some exemplary cases, the processing node sends multiple requests to each node. In some exemplary cases, the processing module transmits the requests to all the nodes concurrently, within a limited period of time, for example within 0.5 seconds.

Step 230 discloses receiving the encrypted backup of each share of the cryptographic key from the multiple computerized nodes.

Step 240 discloses performing a predefined computation based on the received value and public information known to the processing module to validate correctness of the received value. In case the result of the predefined computation shows that the zero-knowledge proof is valid, all the values are true and the node is trustable.

Step 250 discloses storing the encrypted cryptographic key shares if all the multiple computerized nodes send correct values. If in the future, reconstruction is needed, then the private key associated with the public key provided for cold backup can be used to decrypt and obtain all cryptographic key shares and thus the cryptographic key.

Figure 3:
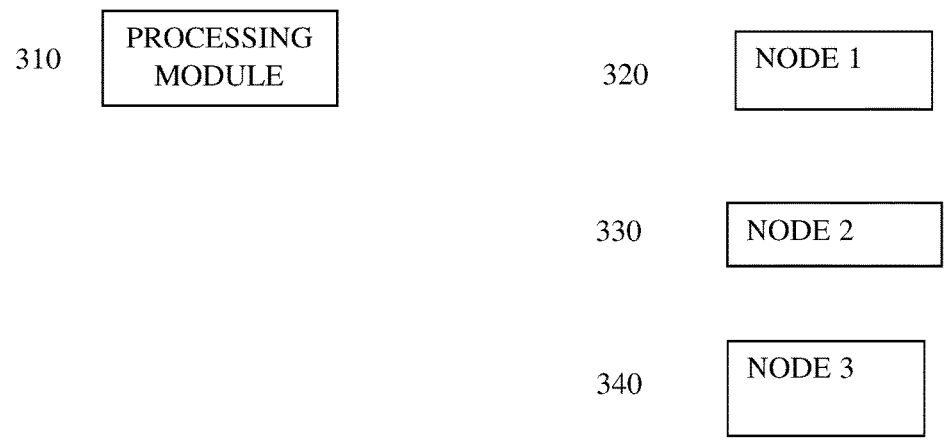
FIG. 3 shows a computerized environment having the processing module as a separate entity and the multiple computerized nodes storing shares of the key, according to exemplary embodiments of the subject matter.

FIG. 3 shows a computerized environment having the processing module as a separate entity and the multiple computerized nodes storing shares of the key, according to exemplary embodiments of the subject matter. The processing module 310 may be a component in any electrical device having a communication module, a memory and a processor. The communication module of the processing module 310 enables exchanging of electrical signals between the processing module 310 and the multiple computerized nodes 320, 330, and 340. In some cases, the communication between the processing module 310 and the multiple computerized nodes 320, 330, and 340 is performed directly, for example a first distinct channel between the processing module 310 and node 320, a second distinct channel between the processing module 310 and node 330 and a third distinct channel between the processing module 310 and node 340. In some other cases, one node of the multiple computerized nodes functions as a relay entity and sends messages received from the processing module 310 to another node and vice versa.

Figure 4:
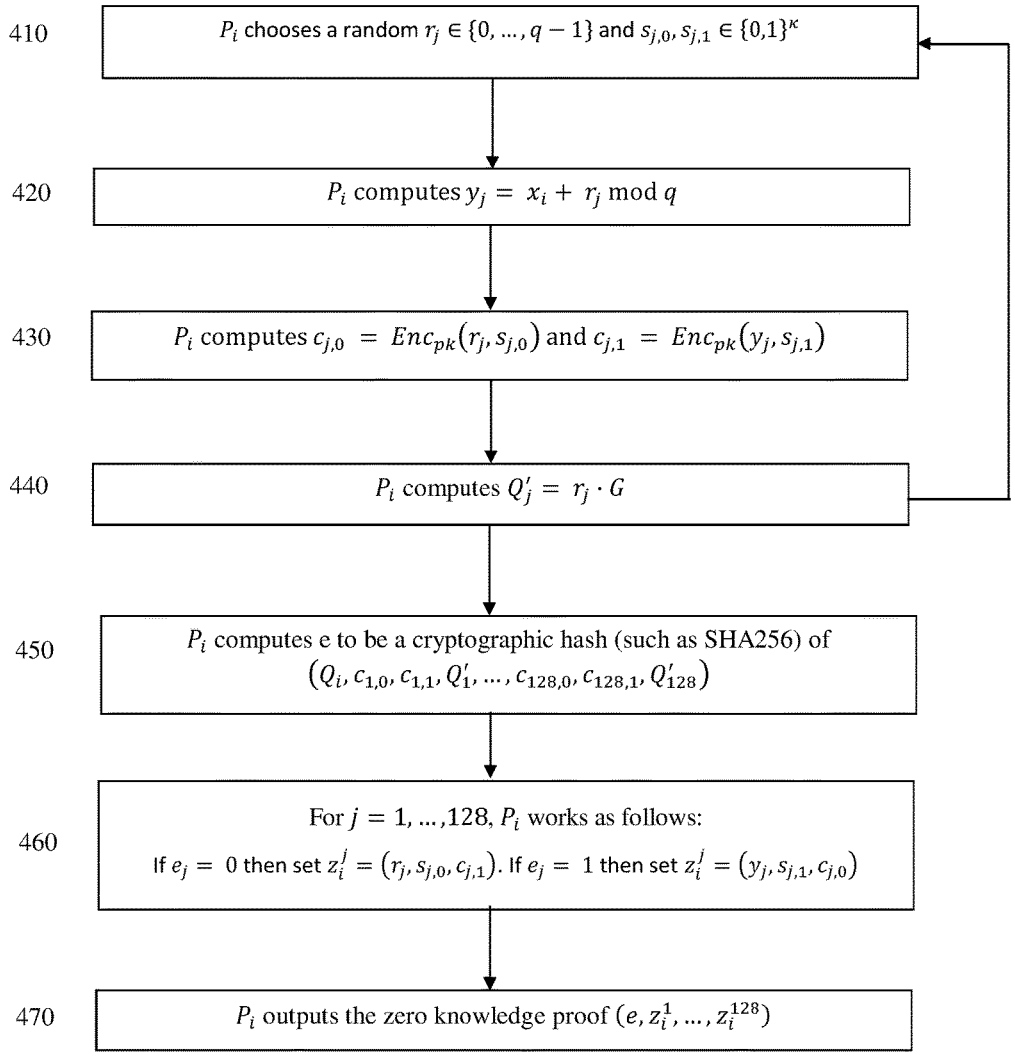
FIG. 4 shows a method of encrypting a backup of a key share and generating a zero-proof knowledge for the key share, according to exemplary embodiments of the subject matter.

FIG. 4 shows a method of encrypting a backup of a key share and generating a zero-proof knowledge for the key share, according to exemplary embodiments of the subject matter. The method is performed by each of the multiple computerized nodes communicating with the processing module and holding a share of the cryptographic key requested to be reconstructed. $P_1, \ldots, P_n$ are defined as the set of multiple computerized nodes who participate in cold backup key generation. For simplicity, the method below refers to one node of the multiple computerized nodes, defined as $P_i$ and holding a key share $x_i$. The following steps are performed multiple times. For simplicity, the below refers to the $j^{th}$ time the node $P_i$ performs the instructions stored in the memory of the node $P_i$.

In step 410, $P_i$ chooses a random $r_j \in \{0, \ldots, q-1\}$ and $s_{j,0}$, $s_{j,1} \in \{0,1\}^K$ (where K is the length of the random string used in the public-key encryption like RSA-OAEP, and where q is the order of the Elliptic curve group of the cryptographic key share).

In step 420, $P_i$ computes $y_j = x_i + r_j$ mod q. G denotes a generator point of the elliptic curve group, and q denotes the order of the elliptic curve group.

In step 430, $P_i$ computes $c_{j,0} = Enc_{pk}(r_j, s_{j,0})$ and $c_{j,1} = Enc_{pk}(y_j, s_{j,1})$, where Enc could be RSA-OAEP for example. That is, the node $P_i$ encrypts the values $r_j$ and $y_j$ using the public key pk every time j that the node $P_i$ operates.

In step 440, $P_i$ computes $Q'_j = r_j \cdot G$. It should be noted that the function Q is irreversible. The node may perform the method of steps 410-440 multiple times, for example in the range of 128-512 times.

In step 450, $P_i$ computes the proof challenge value e to be a cryptographic hash (such as SHA256) of $(Q_i, c_{1,0}, C_{1,1},$ $Q'_1, \ldots, c_{128,0}, c_{128,1}, Q_1'_{28})$. Denote $e = e_1, \ldots, e_{128}$. Then, for the same number of times in which the node performed steps 410-440, the node performs step 460, in which For j=1, ..., 128, $P_i$ works as follows:

If $e_j = 0$ then set $z_i^j = (r_j, s_{j,0}, c_{j,1})$. If $e_j = 1$ then set $z_i^j = (y_j, s_{j,i}, c_{j,0})$.

Then, in step 470, the node outputs the zero-knowledge proof, comprising e and an array of $Z_j$ as computed in step 460.

Figure 5:
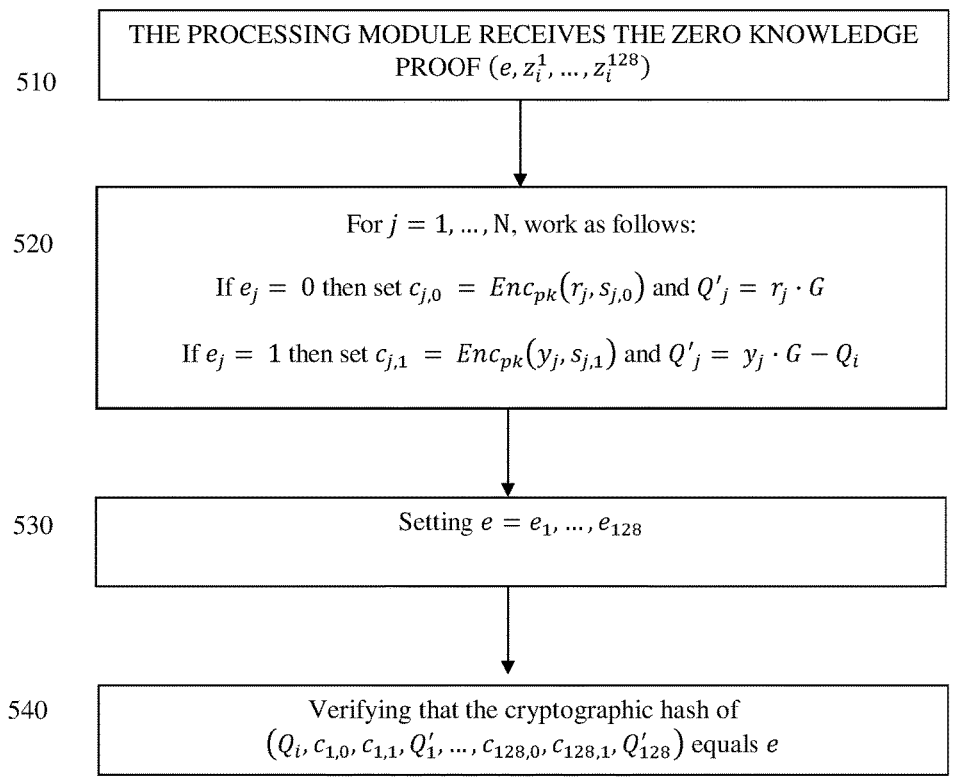
FIG. 5 shows a method of verifying the zero-knowledge proof provided by the node, according to exemplary embodiments of the subject matter; and, FIG. 6 shows a method of reconstructing the key from the key shares, according to exemplary embodiments of the subject matter.

FIG. 5 shows a method of verifying the zero-knowledge proof provided by the node, according to exemplary embodiments of the subject matter. In step 510, the processing module receives the zero-knowledge proof, comprising e and an array of $Z_j$. Step 520 is performed multiple times, using the following computations:

For j=1, ..., N, work as follows:

If $e_j = 0$ then set $c_{j,0} = Enc_{pk}(r_j, s_{j,0})$ and $Q'_j = r_j \cdot G$ If $e_j = 1$ then set $c_{j,1} = Enc_{pk}(y_j, s_{j,1})$ and $Q'_j = y_j \cdot G - Q_i$ Step 530 discloses Setting $e = e_1, \ldots, e_{128}$ and step 540 discloses verifying that the cryptographic hash (like SHA256) of $(Q_i, c_{1,0}, c_{1,1}, Q'_1, \ldots, c_{128,0}, c_{128,1}, Q'_{128})$ equals e. If the output of the hash function equals e, the proof is verified and accepted to be valid.

Figure 6:
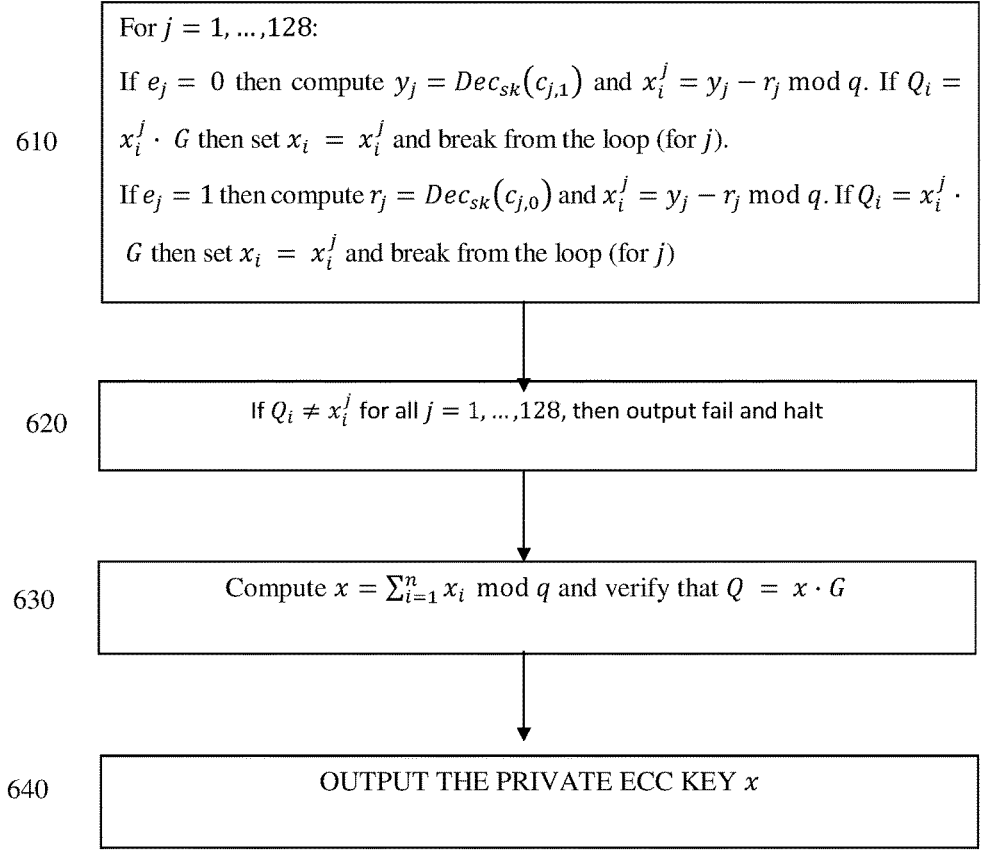

FIG. 6 shows a method of reconstructing the key from the key shares, according to exemplary embodiments of the subject matter. The method is performed in case the proof was verified for each of the nodes. $\pi_i$ denotes the proof from node $P_i$.

Let $\pi_i = (e, z_i^1, \ldots, z_i^{128})$ and denote $e = e_1, \ldots, e_{128}$ In step 610, For j=1, ..., 128:

If $e_j = 0$ then compute $y_j = Dec_{sk}(c_{j,1})$ and $x_i^j = y_j - r_j$ mod q. If $Q_i = x_i^j \cdot G$ then set $x_i = x_i^j$ and break from the loop (for j).

If $e_j = 1$ then compute $r_j = Dec_{sk}(c_{j,0})$ and $x_i^j = y_j - r_j$ mod q. If $Q_i = x_i^j \cdot G$ then set $x_i = x_i^j$ and break from the loop (for j)

Then, in step 620, If $Q_i \neq x_i^j$ for all j=1, ..., 128, then output fail and halt.

Then, in step 630, define $x_1, \ldots, x_n$ be the values obtained. Then, compute $x = \sum_{i=1}^{n} x_i$ mod q and verify that $Q = x \cdot G$. If yes, step 640 discloses output the private ECC key x.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A system for securing a cryptographic key, comprising:
   multiple computerized nodes, each of the multiple computerized nodes is configured to store a public key and a share of the cryptographic key, none of the multiple computerized nodes has access to a share of the cryptographic key stored in another computerized node, each of the multiple computerized nodes is configured to encrypt the share of the cryptographic key stored in the computerized node and to generate a zero-knowledge proof using a set of predefined instructions, wherein the zero-knowledge proof is non-interactive;

a processing module electrically coupled to the multiple computerized nodes, configured to execute the following instructions:

transmitting a request to each node of the multiple computerized nodes for encrypted backup of each share of the cryptographic key and the zero-knowledge proof, said zero-knowledge proof enables the processing module to verify that the encrypted backup share is valid without revealing the encrypted backup;

receiving the encrypted backup of each share of the cryptographic key and the zero-knowledge proof from the multiple computerized nodes;

upon computing a predefined equation to validate correctness of each of the encrypted backup of each share of the cryptographic key based on the zero-knowledge proof received from the multiple computerized nodes, storing the encrypted shares of the cryptographic keys.

2. The system according to claim 1, further comprising the zero-knowledge proof is interactive and the instructions are carried out by at least one node of the multiple computerized nodes.

3. The system according to claim 2, wherein the processing module comprises a storage module configured to store multiple equations, and wherein the processing module selects the equation according to the value representing the zero-knowledge proof as received from each node of the multiple computerized nodes.

4. The system according to claim 2, wherein the zero-knowledge proof value is selected using a cryptographic function.

5. The system according to claim 4, wherein the cryptographic function is a hash function.

6. The system according to claim 1, wherein the processing module obtains a result of a computation of an irreversible function receiving the key share as input.

7. The system according to claim 6, wherein the irreversible function is an elliptical curve having an order known to the processing module.

8. The system according to claim 1, wherein the processing module is further configured to store the encrypted cryptographic key shares if all the multiple computerized nodes sent correct values.

9. The system according to claim 8, wherein the processing module further comprises a communication module configured to reconstruct the cryptographic key given the encrypted cryptographic key shares and transmit it to a party that requested the cryptographic key.

10. The system according to claim 1, wherein the processing module transmits multiple requests to each node of the multiple computerized nodes, until a number of requests meet a predefined criteria.

11. The system according to claim 1, wherein at least one node of the multiple computerized nodes receives a single request from the processing module and generates the zero-knowledge proof comprising multiple values to be computed by the processing module.

12. A method, comprising:

receiving a request to use a cryptographic key, said cryptographic key is divided to shares stored in multiple computerized nodes communicating with a processing module;

the processing module transmitting a request to each node of the multiple computerized nodes for encrypted backup of each share of the cryptographic key and a zero-knowledge proof, said zero-knowledge proof enables the processing module to verify that the encrypted backup share is valid without revealing the encrypted backup;

wherein the zero-knowledge proof is non-interactive;

the processing module receiving the encrypted backup of each share of the cryptographic key and the zero-knowledge proof from one of the multiple computerized nodes;

the processing module upon computing a predefined equation to validate correctness of each of the encrypted backup of each share of the cryptographic key based on the zero-knowledge proof received from the multiple computerized nodes, storing the encrypted shares of the cryptographic keys.

13. The method of claim 12, further comprises storing the encrypted cryptographic key shares received from the multiple computerized nodes upon validating correctness of each of the encrypted backup of each share of the cryptographic key received from the multiple computerized nodes.

14. The method of claim 12, further comprises reconstructing the encrypted cryptographic key using the encrypted key shares received from the multiple computerized nodes and the cold backup private key, after validating correctness of each of the encrypted backup of each share of the cryptographic key received from the multiple computerized nodes.

* * * * *